Figure 1:
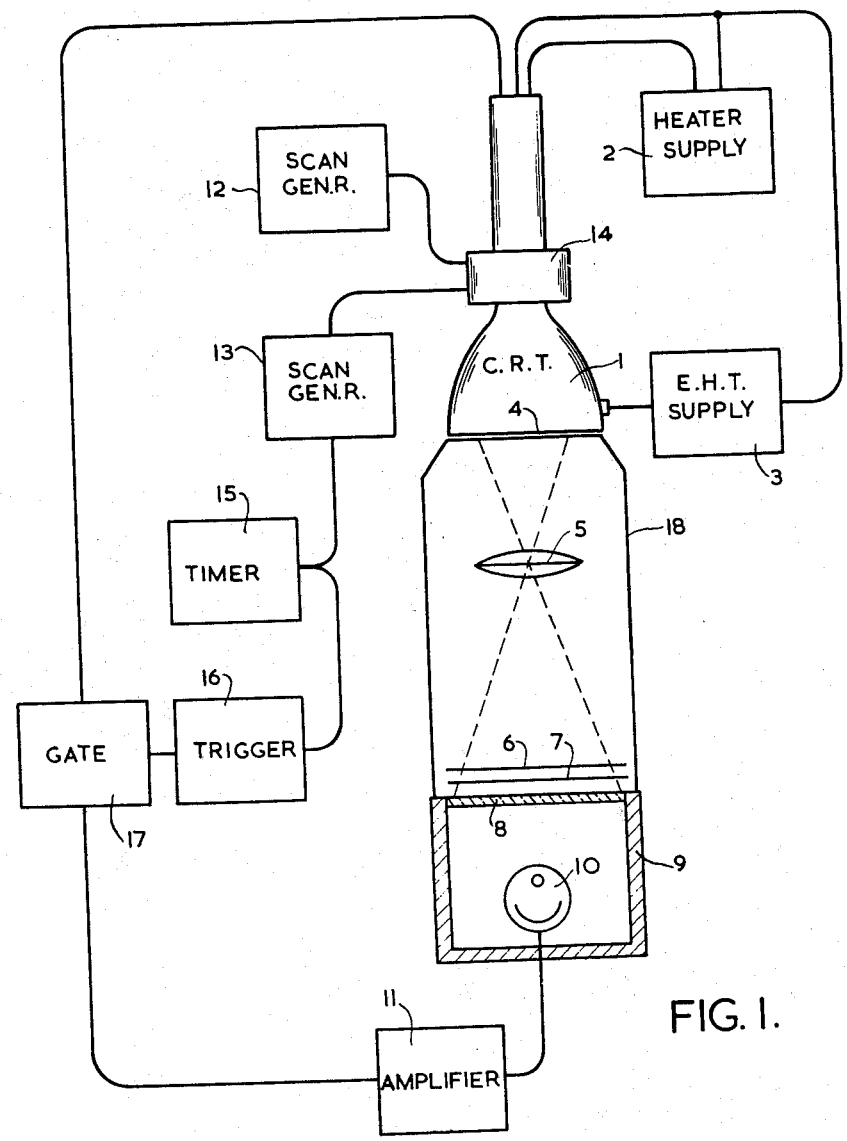

Sept. 19, 1961     G. S. ELPHICK     3,000,286

APPARATUS FOR PHOTOGRAPHIC PRINTING

Filed March 16, 1959

INVENTOR
GEORGE STANLEY ELPHICK
BY Hane and Nydick
ATTORNEYS 3,000,286
APPARATUS FOR PHOTOGRAPHIC PRINTING
George Stanley Elphick, Woldingham, England, assignor to Bush and Rank Cintel Limited
Filed Mar. 16, 1959, Ser. No. 799,592
Claims priority, application Great Britain Mar. 20, 1958
9 Claims. (Cl. 95—73)

In a known system for photographic printing an object is illuminated point-by-point by a light spot of which the brightness is controlled in accordance with the local characteristics of the object in such a manner as to alter its effective contrast. An image of the object thus illuminated is caused to affect photographically sensitive material which is thus exposed to a contrast differing from that of the original object.

The most common application of this system is in the printing of photographic negatives which may have contrast ranges greater than that of the printing paper. In apparatus operating according to this system a photographic negative is illuminated by light imaged upon it from the screen of a cathode ray tube, the electron beam of which is scanned over the screen so that each part in turn of the negative is illuminated. Electrically light-sensitive means exposed to light which has passed through the negative develops an electrical signal which is applied to control the intensity of the electron beam in the tube and thus the brightness of the scanning spot. In such apparatus it has been usual to provide a timing device for determining the period of exposure of the printing paper. Often an electronic timing device is used. Simultaneously with the exposure, which is controlled by producing or suppressing the electron beam in the scanning cathode ray tube, a capacitor is charged until the potential across it is sufficient to cause a voltage-controlled trigger circuit to operate and terminate the exposure by suppressing the electron beam. This arrangement operates reasonably satisfactorily when the period of exposure is long compared with the repetition period of the scanning process used to deflect the spot of the cathode ray tube over the screen. Where short exposures are required, however, the difficulty may arise that the scanning spot does not completely traverse the negative an integral number of times, so that some parts of the resultant print are exposed less than others.

The present invention has the object of avoiding this difficulty and possesses the advantage that it provides a simplified form of apparatus.

Photographic printing apparatus according to the present invention comprises a cathode ray tube light from the screen of which is arranged to illuminate an object to be printed in point-by-point fashion, means for exposing photographically sensitive material to light from said object, a timing device arranged to control exposure and including means for producing a potential varying between two limiting values through one or more complete cycles during an exposure period, this potential being applied to a trigger device arranged when said potential reaches the second of said limiting values for the first or some predetermined subsequent time to terminate said exposure, means operable to produce cyclically repeated deflection of the electron beam of said cathode ray tube in one direction and means controlled by said progressive change in potential for producing deflection of said electron beam in another direction.

It will be appreciated that an advantage of apparatus in accordance with the present invention is that whatever the duration of exposure, an integral number of traversals of the scanned area will be made by the electron beam, so that uniform exposure of the whole object is produced.

In the most usual application of the invention light from the screen of a scanning cathode ray tube is imaged upon a photographic negative which is in contact with photographic printing paper. Light from the negative falls upon a photocell which may be placed to receive either light reflected from the negative or light which passes through the negative and the printing paper. The signal developed by the photocell is applied to control the brightness of the scanning spot, so that the effective contrast of the negative is altered in a desired manner.

In accordance with the present invention, the electron beam of the scanning cathode ray tube is deflected across the screen of the tube in one direction at a constant repetition rate and in a perpendicular direction at a rate determined by the selected duration of exposure, so that traversal of the negative in this direction is completed as the exposure is terminated.

A single embodiment of apparatus incorporating the invention will now be described by way of an example of its application, though the invention is not to be understood as being limited to this specific embodiment.

Figure 2:
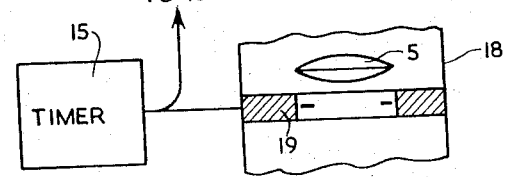

In the accompanying drawing FIG. 1 shows a schematic diagram illustrating a photoprinter incorporating the present invention and FIG. 2 is a fragmentary diagram showing a modification of the photoprinter of FIG. 1. This equipment comprises a cathode ray tube 1 which is provided with appropriate heater and e.h.t. supplies from sources represented at 2 and 3 respectively. Light from the luminescent screen 4 of tube 1 is projected by means of a suitable optical system, represented for the sake of simplicity as a single lens 5, upon a photographic negative 6 which is laid over a sheet of photographic printing paper 7 upon the transparent top 8 of an otherwise opaque box 9 containing a photocell 10. In practice, negative 6 and paper 7 will not be separated, as they are shown for convenience in illustration, but will be closely juxtaposed. They will usually be held closely against the top 8 of box 9 by some suitable device such as a sheet of transparent material. Obviously it will in practice be necessary to surround the optical path from the screen 4 of tube 1 to the top of box 9 by some suitable opaque screen which may be positioned as indicated at 18, to prevent ambient light from disturbing the operation of the equipment. The exact form and arrangement of this screening is of no importance to the invention.

The amount of light reaching photocell 10 will thus vary in accordance with the density of that part of negative 6 upon which the spot of light imaged from screen 4 of tube 1 is at any time incident and will therefore give rise to an electrical signal of which the amplitude is inversely proportional to the local density of the negative. In accordance with known technique this signal is amplified by a suitable amplifier 11, which may sometimes be arranged in known manner to have a non-linear amplitude and/or frequency characteristic, and is applied to control the intensity of the electron beam of tube 1. Usually the polarity of the feedback is negative, so that the effective contract of negative 6 is reduced.

In order that all parts of negative 6 shall be traversed by the light spot imaged from tube 1 it is necessary for the electron beam to be deflected over an appropriate area of screen 4. This is done by the use of conventional scan generator circuits, represented at 12, 13, which supply appropriate currents to a known type of electromagnetic deflection yoke 14 surrounding the neck of tube 1. If desired, scan generators 12, 13 may of course be arranged to control the beam of tube 1 by electrostatic means.

In previously used apparatus, scan generators 12, 13 have usually been arranged to operate at widely differing frequencies, generator 12, for example being arranged to deflect the electron beam in tube 1 across the screen 4 some one thousand times per second and generator 13 to deflect the beam in another direction at a low repetition rate, such as three times per second. As has already been explained, apparatus of this kind suffers from the disadvantage that when the period of exposure is not an integral multiple of the period of lower-frequency deflection the print will not be uniformly exposed. For short exposure times the difference in exposure may be very obvious in the print.

The present invention overcomes this disadvantage by ensuring that an exposure of any duration will contain a whole number of periods of the deflection of lower periodicity. In the normal case each exposure period will be coincident with a single traversal of the scanning deflection of lower periodicity, but for any case in which it would be advantageous it is easy to arrange that a greater number of cycles of deflection will occur during the period of exposure.

In the embodiment illustrated the invention is carried out by providing a sawtooth generator 15 which may be of any suitable known type producing a voltage varying progressively between a first and a second value during an interval which is adjustable and which is equal either to the desired duration of exposure or to an integral fraction of this time. Generator 15 may for example comprise a capacitor arranged to be charged or discharged from a first to a second potential by means of a constant-current device such that the current which it passes is adjustable. One known constant-current device of this type is a pentode valve provided with a variable grid bias, but other equivalent circuits are known.

The output from sawtooth generator 15 thus comprises a voltage changing uniformly from a first to a second value over a predetermined and adjustable period. This output is applied firstly to a trigger circuit 16 which is arranged to provide an output signal when the voltage applied to it reaches a predetermined value. Any suitable known form of voltage-operated trigger circuit may be used for this purpose. When trigger 16 yields its output signal this is applied to a gate circuit 17 to cause the gate to connect the grid of cathode ray tube 1 to a bias voltage such that the electron beam in tube 1 is suppressed. An obvious alternative to this arrangement which might under some circumstances be preferred would be to cause the output signal from trigger 16 to close an electromagnetically released shutter 19 situated in the optical path between tube 1 and negative 6 as shown in FIGURE 2 of the drawing.

In accordance with the present invention the sawtooth voltage developed by sawtooth generator 15 is applied also to scan generator 13 to control the deflection of the electron beam of tube 1 in one direction. The beam will thus be deflected across the screen in this direction once only during the exposure of the print. It is obviously necessary that scan generator 12 shall be arranged to produce deflection of the electron beam of tube 1 in the other coordinate direction at a repetition rate sufficiently high that the scanning lines traced on negative 6 by the light imaged on it from screen 4 shall overlap. The minimum repetition rate necessary to ensure this is readily calculated and in principle any rate higher than this may be used. It is sometimes found however that it is disadvantageous to employ a constant rate of deflection in this direction and that it is better to employ a repetition rate varied with the period of exposure. This may readily be effected by employing ganged switches to control the period of exposure and the repetition rate of the fast timebase.

It is of course possible to apply the invention in apparatus in which an image of the negative to be printed is projected upon the printing paper by intervening optical means instead of by placing the negative in contact with the paper. The necessary or desirable modifications to the apparatus already described are thought to be obvious to those skilled in the art.

I claim:

1. Photographic printing apparatus comprising a cathode ray tube having a fluorescent screen, means for generating an electron beam within said tube and causing it to impinge upon said screen to cause the emission of light therefrom, optical means for forming an image of said screen upon an object to be printed, means for exposing photographic material to light from said object, a timing device for controlling the exposure of said photographic material, means for terminating said exposure, said timing device including capacitance means, means for imparting a charge to said capacitance means varying at a constant, adjustable rate and trigger means fed with the voltage developed across said capacitance means and, in response to said voltage exceeding a predetermined value, providing an output signal to said control means for terminating said exposure, means operable to produce cyclically repeated deflection of the electron beam of said cathode ray tube in a first direction and means controlled by said progressively changing potential for producing deflection of said electron beam in a second direction perpendicular to said first direction at a rate such that a traversal of said electron beam over said screen in said second direction is completed each time said potential reaches said predetermined value.

2. Photographic printing apparatus as defined in claim 1 and including a photoelectrically sensitive device placed to receive light from said screen after modification by said object and means for applying signals developed by said photoelectrically sensitive device to modify the intensity of the electron beam of said cathode ray tube.

3. Photographic printing apparatus as defined in claim 1 in which said means for terminating said exposure comprises an electromagnetically released shutter to which said output signal is applied.

4. Photographic printing apparatus as defined in claim 1 wherein said cathode ray tube includes a grid, and comprising a gate circuit arranged when supplied with a control signal to connect th grid of said cathode ray tube to a bias voltage such that the electron beam in said cathode ray tube is suppressed.

5. Photographic printing apparatus comprising a cathode ray tube including a grid and a fluorescent screen, means for developing an electron beam within said tube and for causing it to impinge upon said screen to cause the emission of light therefrom, means for supporting a photographic negative in a plane, optical image-forming means for projecting an image of said screen in said plane, means for supporting translucent photographically sensitive material in juxtaposition to said negative, photoelectrically light sensitive means arranged to be exposed to light from said screen passed through said photoelectrically sensitive material to cause said means to develop electrical signals, amplifier means for amplifying the signals developed by said photoelectrically light sensitive means, means for applying said amplified signals to modify the intensity of the electron beam in said cathode ray tube, timing means comprising a capacitor together with a source of potential and a constant-current device imparting a charge to said capacitor changing at a constant rate and trigger circuit means fed with the potential across said capacitor and arranged to yield an output signal when the said potential reaches a predetermined value, first scan generator means for developing a scanning current varying cyclically at a predetermined rate, first deflector means fed with said scanning current for producing deflection of the electron beam of said cathode ray tube at said predetermined rate in a first predetermined direction, second scan generator means fed with the potential developed across said capacitor for developing a further scanning current varying as said potential, second deflector means fed with said further scanning current for producing deflection of said electron beam in a second predetermined direction perpendicular to said first direction at a rate such that a traversal of said electron beam over said screen in said second direction is completed each time said potential reaches said predetermined value, and gate means fed with the output signal from said trigger means and responsive to said signal by applying to the grid of said cathode ray tube a potential such as to suppress said electron beam.

6. Photographic printing apparatus as defined in claim 5 in which said amplifier means has a non-linear amplitude characteristic.

7. Photographic printing apparatus as defined in claim 5 in which said amplifier means has a non-linear frequency characteristic.

8. Photographic printing apparatus as defined in claim 5 in which said amplified signals are applied to said cathode ray tube so as to reduce the intensity of said electron beam as the illumination of said photoelectrically light-sensitive means increases.

9. Photographic printing apparatus as defined in claim 5 in which said photoelectrically light-sensitive means is a photocell.

References Cited in the file of this patent
UNITED STATES PATENTS

| | | |
|---|---|---|
| 2,309,048 | Curry | Jan. 19, 1943 |
| 2,691,917 | Curry | Oct. 19, 1954 |
| 2,757,571 | Loughnen | Aug. 7, 1956 |
| 2,764,060 | Horak | Sept. 25, 1956 |
| 2,842,025 | Craig | July 8, 1958 |